(12) United States Patent
Wilk

(10) Patent No.: US 11,385,379 B2
(45) Date of Patent: Jul. 12, 2022

(54) METHODS FOR DETECTING DEPOSITS OF KNOWN MATERIALS

(71) Applicant: Peter J. Wilk, New York, NY (US)

(72) Inventor: Peter J. Wilk, New York, NY (US)

(*) Notice: Subject to any disclaimer, the term of this patent is extended or adjusted under 35 U.S.C. 154(b) by 0 days.

(21) Appl. No.: 16/750,794

(22) Filed: Jan. 23, 2020

(65) Prior Publication Data

US 2022/0171090 A1     Jun. 2, 2022

(51) Int. Cl.
| G01V 9/00 | (2006.01) |
| G01N 21/87 | (2006.01) |
| A44C 17/02 | (2006.01) |
| A44C 17/04 | (2006.01) |

(52) U.S. Cl.
CPC .............. G01V 9/007 (2013.01); A44C 17/02 (2013.01); A44C 17/04 (2013.01); G01N 21/87 (2013.01)

(58) Field of Classification Search
CPC ........ G01N 33/24; G01N 1/2294; G01N 1/08; G01N 1/22; G01N 2001/021; G01N 2001/2285; G01N 2001/4016; G01N 2021/1793; G01N 2021/6417; G01N 21/631; G01N 21/645; G01N 33/0075; G01N 21/87; G01V 9/007; A44C 17/02; A44C 17/04
See application file for complete search history.

(56) References Cited

U.S. PATENT DOCUMENTS

| 1,843,878 | A | 2/1932 | Gunter |
| 4,565,786 | A | 1/1986 | Dunkhase et al. |
| 4,573,354 | A | 3/1986 | Voorhees et al. |
| 5,879,631 | A | 3/1999 | Wewers et al. |
| 6,598,458 | B1 | 7/2003 | Edwards et al. |
| 6,724,481 | B2 | 4/2004 | Makino et al. |
| 6,802,227 | B2 | 10/2004 | Lindgren et al. |
| 7,520,186 | B2 | 4/2009 | Risk |
| 8,101,915 | B2 | 1/2012 | McGill et al. |
| 8,152,992 | B2 | 4/2012 | Smela et al. |
| 8,193,496 | B2 | 6/2012 | Furry |
| 8,826,726 | B2 | 9/2014 | Schmid et al. |
| 9,435,782 | B2 | 9/2016 | Lenz et al. |
| 9,671,392 | B2 | 6/2017 | Jeppsen et al. |
| 9,952,171 | B2 | 4/2018 | Hunziker et al. |

(Continued)

FOREIGN PATENT DOCUMENTS

| CN | 203929631 U | 11/2014 |
| CN | 205562504 U | 9/2016 |

(Continued)

OTHER PUBLICATIONS

Tiwale, N, "Zinc Oxide Nanowire Gas Sensors: Fabrication, Functionalisation and Devices," Materials Science and Technology, vol. 31, No. 14, pp. 1681-1697, 2015 (18 pages).

*Primary Examiner* — Jennifer Wecker
(74) *Attorney, Agent, or Firm* — Lawrence B. Goodwin, PLLC

(57) ABSTRACT

A method and apparatus detects an unknown deposit in soil of a known mineral or gemstone using characteristic scents of the mineral or gemstone. The method may disturb the soil, for example, by causing a chemical reaction in at least part of the soil such that a mineral or gemstone present in the soil emits a characteristic scent. The unknown deposit of the known mineral or gemstone can be detected in real-time or near real-time in the field.

31 Claims, 6 Drawing Sheets

(56) References Cited

U.S. PATENT DOCUMENTS

| | | |
|---|---|---|
| 10,018,556 B2 | 7/2018 | Sakai et al. |
| 10,222,338 B1* | 3/2019 | Wilk ................... G01N 21/71 |
| 2005/0042758 A1 | 2/2005 | Zyhowski et al. |
| 2007/0073491 A1* | 3/2007 | Jahn ..................... G01V 8/02 |
| | | 702/23 |
| 2007/0218556 A1* | 9/2007 | Harris ................. G01N 21/718 |
| | | 436/25 |
| 2007/0221863 A1 | 9/2007 | Zipf |
| 2009/0301234 A1 | 12/2009 | Risk |
| 2011/0030449 A1* | 2/2011 | Hosono ................ G01N 33/24 |
| | | 73/23.34 |
| 2012/0035850 A1* | 2/2012 | Risk .................... G01N 1/2205 |
| | | 702/2 |
| 2017/0122889 A1* | 5/2017 | Weindorf ........... G01N 21/3563 |
| 2018/0188225 A1* | 7/2018 | Viscarra Rossel ........................ |
| | | G01N 23/2204 |
| 2019/0170640 A1* | 6/2019 | Kormann .................. G01J 3/18 |

FOREIGN PATENT DOCUMENTS

| | | |
|---|---|---|
| DE | 19919603 A1 | 11/2000 |
| WO | 2007082955 A1 | 7/2007 |

\* cited by examiner

METHODS FOR DETECTING DEPOSITS OF KNOWN MATERIALS

FIELD OF THE INVENTION

Illustrative embodiments of the invention generally relate to locating mineral or gemstone deposits in soil and, more particularly, to locating unknown deposits of known minerals or gemstones by characteristic scent.

BACKGROUND OF THE INVENTION

There are over 3000 known minerals which are fundamental to our modern world. As they are used daily, the world's reserves of these minerals needs to be constantly replenished. Finding undiscovered mineral deposits, however, often includes extensive and expensive exploration and excavating.

SUMMARY OF VARIOUS EMBODIMENTS

In accordance with one embodiment of the invention, a method of locating a mineral or gemstone deposit in soil positions a chemical detector at or above a surface of the soil within a search region. The method includes disturbing at least a portion of the soil to cause a chemical reaction such that the soil emits an outgas signature. The outgas signature emitted from the soil is detected at or above the surface of the soil using the chemical detector, and determines the presence of one or more mineral or gemstone in the soil based on the detected outgas signature.

In illustrative embodiments, disturbing the at least a portion of the soil includes at least one of burning the at least a portion of the soil, applying an acid or a chemical to the at least a portion of the soil, applying a gas to the at least a portion of the soil, or directing a light beam to the at least a portion of the soil. Detecting the outgas signature emitted from the surface of the soil can further include scanning the chemical detector over at least a portion of the surface of the soil.

In some embodiments, positioning the chemical detector includes positioning the chemical detector on the surface of the soil. In other embodiments, positioning the chemical detector includes positioning the chemical detector above the surface of the soil.

Determining the presence of the one or more mineral or gemstone in the soil based on the detected outgas signature can occur in real-time or near-real time to detecting the outgas signature emitted from the soil. In some embodiments, determining the presence of the one or more mineral or gemstone in the soil based on the detected outgas signature can further include determining that the detected outgas signature includes a level of at least one characteristic gas after the soil was burned by fire that deviates from an expected level of the at least one characteristic gas. The mineral or gemstone can be selected from a group consisting of sulfur, pyrite, arsenic, arsenopyrite, antozonite, sphalerite, jet, anthraconite, amber, oil shale, kaolinite, gypsum, carbonate, galena, hutchinsonite, and coloradoite.

In accordance with another embodiment, a computer program product for use on a computer system for locating a mineral or gemstone deposit in soil includes a tangible, non-transient computer usable medium having computer readable program code thereon including program code for receiving from a chemical detector a detected outgas signature emitted from a surface of soil as a result of a chemical reaction in the soil located within a search region. The computer program product also includes program code for comparing the detected outgas signature to one or more characteristic outgas signatures of known minerals or gemstones and program code for determining a match between the detected outgas signature and the one or more characteristic outgas signatures. Program code is also included for determining a presence of one or more minerals or gemstones in the soil based on the determined match between the detected outgas signature and the one or more characteristic outgas signatures, where the detected outgas signature is detected with the chemical detector placed at or above the surface of the soil.

In some embodiments, the one or more minerals or gemstones is selected from the group consisting of sulfur, pyrite, arsenic, arsenopyrite, antozonite, sphalerite, jet, anthraconite, amber, oil shale, kaolinite, gypsum, carbonate, galena, hutchinsonite, and coloradoite.

The program code for determining the presence of one or more mineral or gemstone deposits in the soil can further include program code for comparing the detected presence of the at least one characteristic gas to a library of known characteristic gas emissions associated with a mineral or gemstone. In some embodiments, determining the presence of the one or more minerals or gemstones occurs in real-time or near real-time.

In yet another illustrative embodiment, a system for locating a mineral or gemstone deposit in soil includes an electronic chemical detector configured to detect an outgas signature emitted form the soil as a result of a chemical reaction from a position at or above a surface of the soil. The system also includes a detection system tool configured to determine a presence of one or more mineral or gemstone in the soil based on the detected outgas signature and characteristic outgas signatures of known minerals and gemstones including at least one characteristic gas.

In some embodiments, the system further includes an energy source configured to disturb at least a portion of the soil such that the soil emits the at least one characteristic gas. In some instances, the energy source is a laser or a light beam. The energy source can apply at least one of an acid, a chemical, or a gas to the at least a portion of the soil. The energy source can burn the at least a portion of the soil.

The system can determine the presence of one or more mineral or gemstone, with the one or more mineral or gemstone selected from the group consisting of sulfur, pyrite, arsenic, arsenopyrite, antozonite, sphalerite, jet, anthraconite, amber, oil shale, kaolinite, gypsum, carbonate, galena, hutchinsonite, and coloradoite.

In some embodiments, the detection system tool further includes a comparator configured to compare the detected outgas signature to a library of known characteristic outgas signatures emitted from at least one of known minerals and known gemstones.

BRIEF DESCRIPTION OF THE DRAWINGS

Those skilled in the art should more fully appreciate advantages of various embodiments of the invention from the following "Description of Illustrative Embodiments," discussed with reference to the drawings summarized immediately below.

DESCRIPTION OF ILLUSTRATIVE EMBODIMENTS

In illustrative embodiments, a method locates one or more unknown deposit of a known mineral or gemstone in soil based on an outgas signature emitted from the soil. The outgas signature includes a gas emitted from a surface of the soil in a particular region. To that end, a chemical detector device is placed at or above a surface of the soil and detects an outgas signature emitted from the soil. Some embodiments induce a chemical reaction in at least a portion of the soil to cause outgassing. Outgassing may also occur naturally from some elements. The detected outgas signature is then analyzed and compared to characteristic outgas signatures of known minerals and gemstones to identify a presence of one or more known mineral or gemstone in the soil. As such, the method can more efficiently, with respect to both time and cost, detect and locate a previously unknown deposit in soil. Accordingly, a prospector can allocate resources to areas in which there is a higher likelihood of discovering valuable mineral or gemstone deposits. Details of the illustrative embodiments are discussed below.

Deposits of valuable minerals or gemstones typically lie underground, with the detection of such deposits remaining technically difficult without excavation of the land. Undesirably, land excavation can be costly, particularly due to the somewhat speculative nature of mineral exploration. Illustrative embodiments of the present disclosure provide more efficient methods for locating valuable mineral or gemstone deposits.

Certain illustrative embodiments will now be described to provide an overall understanding of the principles of the structure, function, and use of the devices and methods disclosed herein. One or more examples of these embodiments are illustrated in the accompanying drawings. Those skilled in the art will understand that the devices and methods specifically described herein and illustrated in the accompanying drawings are non-limiting exemplary embodiments and that the scope of the present disclosure is defined solely by the claims. The features illustrated or described in connection with one exemplary embodiment may be combined with features of other embodiments. Such modifications and variations are intended to be included within the scope of the present disclosure.

Figure 1:
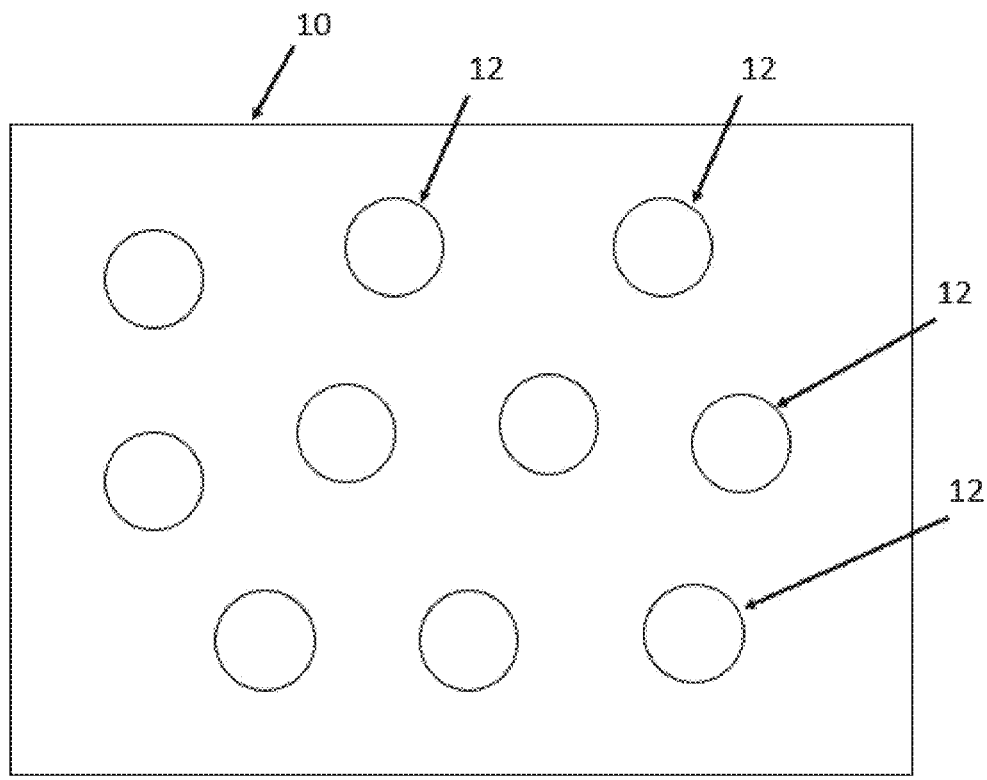
FIG. 1 schematically shows a plot of land that may be analyzed for unknown deposits of a mineral or gemstone.

FIG. 1 schematically shows a plot of land 10 that may be analyzed for unknown deposits of known minerals and/or gemstones. As used herein, unless stated otherwise, the term "mineral" includes metals. Moreover, for purposes of simplicity of the disclosure, the term "element" as used herein may generally refer to a known mineral or gemstone. The plot of land 10 has one or more search regions 12 that can be analyzed for unknown deposits. At least a portion of a surface of the search region 12 includes exposed soil. While each search region 12 is illustrated as a circle in FIG. 1, the search region 12 can be of different shape or size. Additionally, the number of regions 12 in a given plot of land 10 can be greater or fewer than the ten regions illustrated in FIG. 1.

Figure 2:
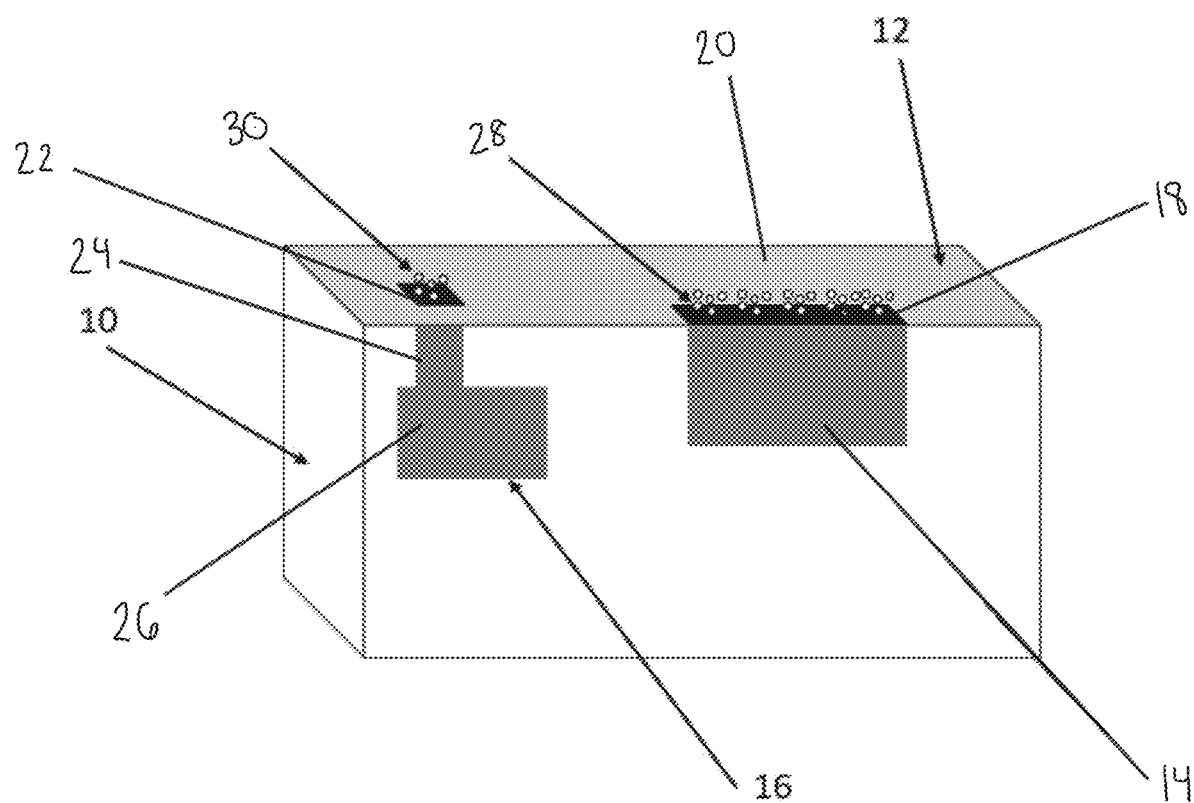
FIG. 2 schematically shows a cross-section of a search region containing mineral or gemstone deposits in the plot of land of FIG. 1.

FIG. 2 shows a cross-sectional view of an exemplary search region 12 in the plot of land 10. As shown, there are two unknown element deposits 14, 16 present within the plot of land 10. The first unknown deposit 14 has a surface area 18 that generally corresponds to a profile of the deposit 14. In other words, a cross-sectional layer of the deposit 14 taken along a plane parallel to a surface 20 of the region 12 is substantially the same shape as the surface area 18 of the deposit 14. In contrast, the second deposit 16 has a surface area 22 and a mineral vein 24 extending from the surface area 22 to an expanded deposit region 26. At the surface 20 of the region 12, the one or more elements present at the surface of each deposit 14, 16 emits an outgas signature. More particularly, the one or more elements present the first deposit 14 emits an outgas signature 28 at the surface 18 of the first deposit 14. Similarly, the one or more elements present in the second deposit 16 emits an outgas signature 30 at the surface 22 of the second deposit 16.

As described in detail below, illustrative embodiments detect and analyze the outgas signature emitted from a soil surface to identify the presence of one or more known element deposits in the soil. Comparing and determining a match between the detected outgas signature and characteristic outgas signatures of known elements indicates that the known element(s) are present in the soil, thereby locating the previously unknown deposit. In some instances, a mineral or gemstone present in soil naturally outgasses or emits a gas. In other instances, at least a portion of the soil in the region 12 can be disturbed to cause a chemical reaction. Outgassing as a result of the chemical reaction can then be detected and analyzed.

Figure 3A:
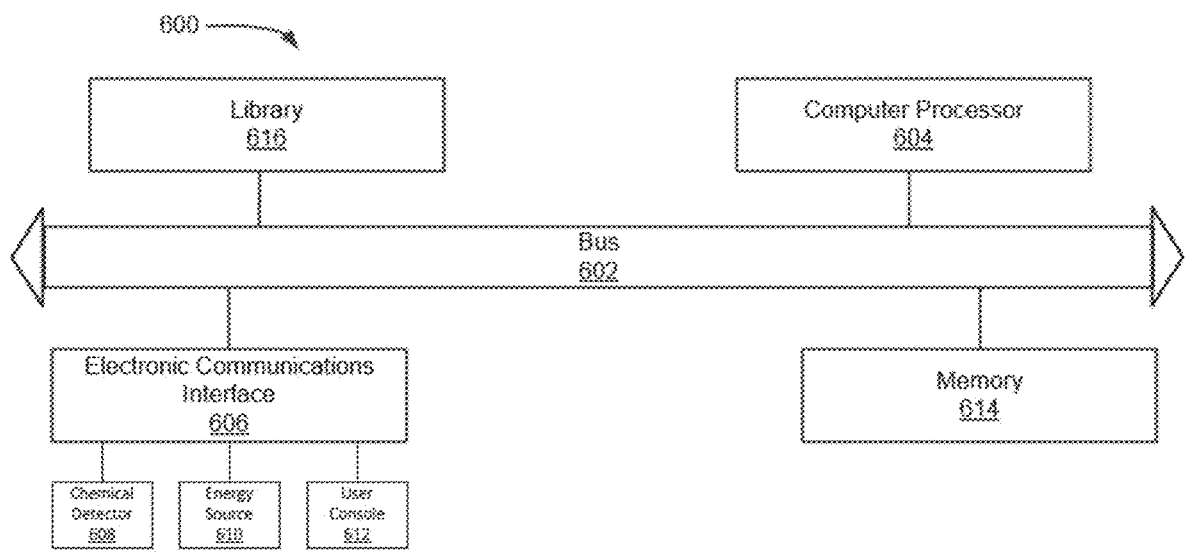
FIG. 3A schematically shows details of a system for locating an unknown deposit of a known mineral or gemstone in accordance with illustrative embodiments of the invention.

FIG. 3A schematically illustrates an embodiment of a detection system 600 having several elements in electronic communication over a bus 602. The detection system 600 is used to identify unknown deposits of known elements as described in detail below. All or a portion of the detection system 600 can be integrated within a chemical detection tool and/or in a device external to the chemical detection tool, such as a phone, tablet, or computer device. In general, some or all of the elements may be implemented in one or more integrated circuits (e.g., as an ASIC), a gate array, a microcontroller, or a custom circuit. Some of the elements may be implemented in non-transient computer-implemented code capable of being executed on a computer processor 604.

The detection system 600 includes an electronic communication interface 606 configured to communicate with components, such as a chemical detector device 608, an energy source 610, a user console 612, etc. To that end, the communications interface 606 may include various communications interfaces, such as an Ethernet connection, a USB port, or a Firewire port. The user console 612 can be a phone, tablet, computer, display screen of the chemical detector tool, or other indicator, such as a light, on the chemical detector tool. The electronic communications interface 606 receives a detected outgas signature from the chemical detector 608. A non-transient digital memory 614 (e.g., RAM or ROM) for storing data may store, among other things, an electronic version of the detected outgas signature received from the chemical detector 612. More particularly, the bus 602 transmits an electronic version of the detected outgas signature from the electronic communications interface 606 to the memory 614 and/or computer processor 604. The memory 614 can store a plurality of detected outgas signatures from one or more search regions. A library 616 stores characteristic outgas signatures of known elements. For example, the library 616 may contain a characteristic outgas signature naturally emitted by the mineral sulfur and a characteristic outgas signature that is emitted by the mineral sulfur when sulfur is heated. The library 616 holds any number of characteristic outgas signatures of known elements that are either naturally emitted or emitted as a result of a particular chemical or physical reaction. By way of example, the library can include data presented in the table below. It will be appreciated that the library 616 can store any number of elements and the corresponding outgas electronic signature.

TABLE 1

Exemplary Stored Electronic Outgas Signatures of Known Elements

| Element | Outgas Signature |
|---|---|
| Arsenic (natural emission) | Electronic Signature 1 |
| Calcite (treated with hydrochloric acid) | Electronic Signature 2 |
| Jet (heated) | Electronic Signature 3 |
| Sulfur (natural emission) | Electronic Signature 4 |
| Sulfur (heated) | Electronic Signature 5 |

The computer processor 604 may include a microprocessor or a processor core. The computer processor 604 may have an on-board, non-transient digital memory (e.g., RAM or ROM) for storing data and/or computer code, including non-transient instructions for implementing some or all of the control system operations and methods. Alternatively, or in addition, the computer processor 314 may be operably coupled to other non-transient digital memory, such as RAM or ROM, or a programmable non-transient memory circuit for storing such computer code and/or control data. Consequently, some or all of the functions of the detection system 600 may be implemented in software configured to execute on the computer processor. The computer processor 604 includes instructions (e.g., in the form of computer code) for obtaining one or more detected outgas signatures and comparing the one or more detected outgas signatures to one or more characteristic outgas signatures contained in the library 610. For example, the chemical detector 608 outputs to the electronic control interface 606 the detected outgas signature in the form of an electronic signature (i.e., a detected electronic outgas signature). The computer processor 604 then compares the detected electronic outgas signature to the electronic signatures of known elements stored in the library 616, such as those displayed in Table 1 above. If a match is determined between a detected outgas signature and a characteristic outgas signature, the detection system 600, by way of instructions from the computer processor 604, may store the match in the memory and may indicate the match to a user, for example, by sending the information to the user console 612. It will be appreciated that a match can be an exact match or can fall within an acceptable match tolerance. For example, a match can be detected when the known characteristic gas signature matches the detected outgas signature at a 90% match rate. The acceptable match tolerance can be greater or lesser than 90%.

Figure 3B:
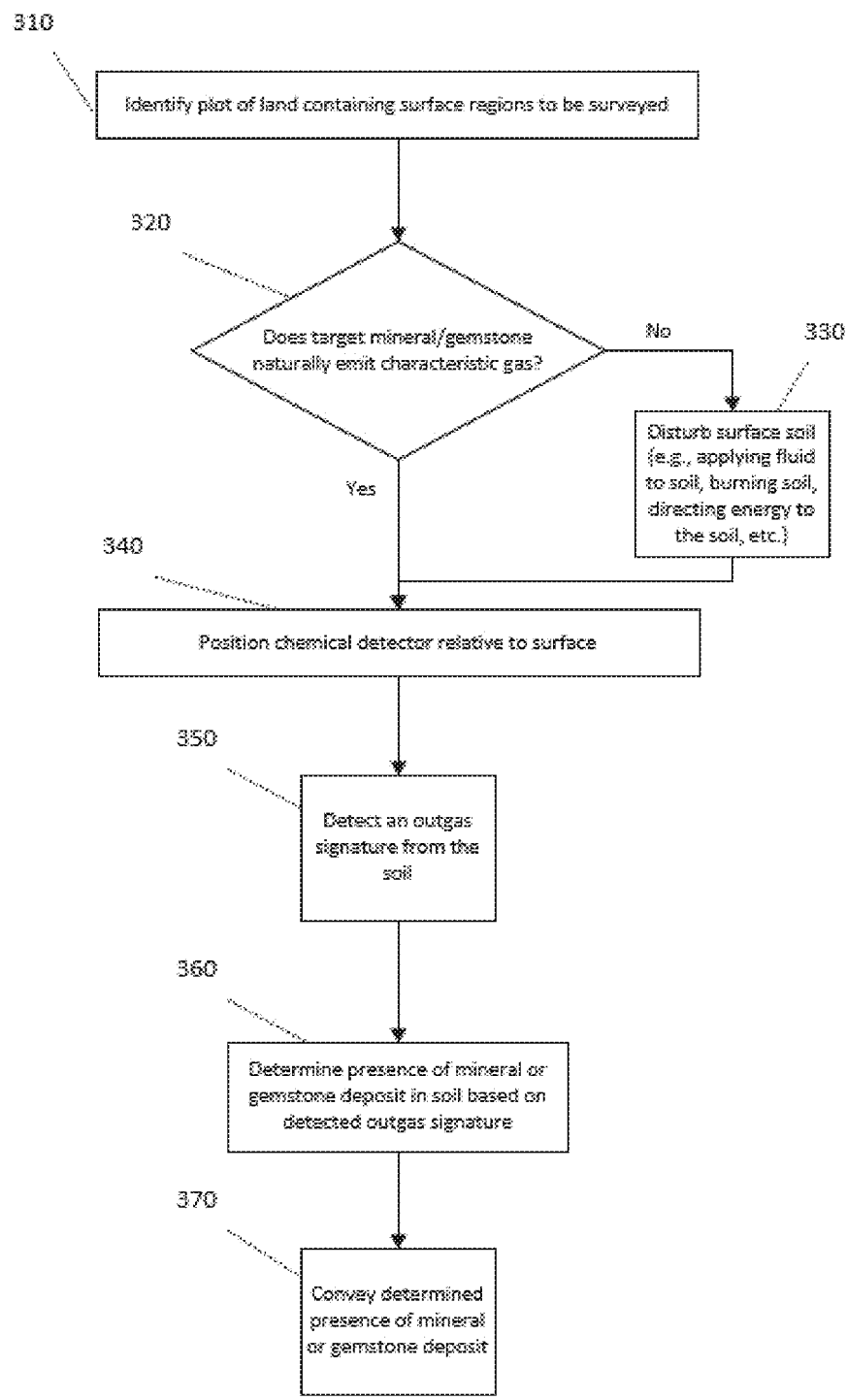
FIG. 3B shows an illustrative embodiment of a process of detecting a mineral or gemstone deposit in soil.

FIG. 3B shows an illustrative embodiment of a method of locating an unknown deposit of a known mineral or gemstone in soil. It should be noted that this method is simplified from a longer method that likely would be used to locate a mineral using illustrative embodiments. Accordingly, the method may have various other steps, such as preparation and post-analysis steps, that those skilled in the art likely would use. In addition, some of the steps may be performed in a different order than that shown, or at the same time. Those skilled in the art therefore can modify the process as appropriate.

The method begins at step 310, which identifies a plot of land 10 containing at least one soil surface region 12 (i.e., a search region) for surveying. By way of example, the plot of land 10 may be strategically identified by a surveyor based on prior deposit discoveries, land characteristics, or other indication or instinct that makes a particular plot of land of interest. Alternatively, the plot of land 10 can be selected at random. In some embodiments, the plot of land 10 can be identified with the aim of locating an unknown deposit of one or more particular minerals or gemstones. In other embodiments, the plot of land 10 can be identified with an aim of locating an unknown deposit of any known mineral or gemstone.

As noted above, certain elements naturally emit a characteristic gas. At step 320, if a target element naturally outgasses or emits a characteristic gas, the method proceeds to step 340 by positioning a chemical detector 608 proximate or near the surface region. Additionally or alternatively, it may be desired to survey the search region to detect what, if any, natural outgassing occurs from the search region. In such a case, the method proceeds to step 340.

If the target element does not naturally emit gas, the method proceeds to step 330 by disturbing or processing at least a portion of the surface soil to encourage outgassing from one or more elements potentially present in the soil. Additionally or alternatively, it may be desired to survey the search region to detect what, if any, outgassing occurs as a results of disturbing or processing at least a portion of the surface soil. In such a case, the method also proceeds to step 330 from step 320. Among other ways, various embodiments can disturb the surface soil by applying a chemical, acid, or other fluid to at least a portion of the soil, burning at least a portion of the soil, directing an energy beam from an energy source 610 (e.g., a laser) to at least a portion of the soil, and/or striking at least a portion of the soil. Disturbing at least a portion of the soil can stimulate chemical or other reaction(s) in one or more element present in the soil to cause the one or more elements to produce detectable outgassing. As discussed in greater detail below, some instances in which at least a portion of the soil is burned can include natural burning and/or intentional burning of the soil. After disturbing or processing the soil, the method proceeds to step 340 for positioning of a chemical detector 608. In some instances, step 330 and step 340 may overlap or occur simultaneously.

At step 340, the chemical detector 608 is positioned at or above a surface of the soil in the search region. The chemical detector can be integrated into a handheld device operable by a user. For example, a user can place or scan the handheld device across the surface of the search region. In other embodiments, the chemical detector may be a component of a detection device attached to a vehicle (e.g., a car, drone, bicycle, etc.) or a stationary apparatus placed within or passing through the search region. By way of example, the chemical detector can be a "nose-on-a-chip," "e-sniffer," or other conventional chemical detector capable of detecting elements present in a gas. Alternatively, the chemical detector may be an animal trained to detect a particular gas or gasses and react in a certain way to alert a user of the detected gas or gasses presence.

At step 350, the chemical detector detects an outgas signature emitted from the soil in the selected search region. The chemical detector 608 can detect elements present in the outgas emitted from the soil and can convert the detected elements in the gas into an electronic outgas signature.

At Step 360 a detection system tool determines the presence of one or more element deposits in the soil of the search region based on the outgas signature detected in step 350. To that end, the method may compare the detected outgas signature to known characteristic outgas signatures of known minerals and/or gemstones. For example, the system can then compare the detected electronic outgas signature to signatures of known elements. In some embodiments, the signatures of known elements can be stored in a library 616 for comparison against the detected electronic outgas signature. When a match is determined between the detected outgas signature and a known characteristic gas signature, the detection system tool determines the presence of the mineral and/or gemstone that corresponds to the matched known characteristic outgas signature. It will be appreciated that a match can be an exact match or can fall within an acceptable match tolerance. For example, a match can be detected when the known characteristic gas signature matches the detected outgas signature at a 90% match rate. The acceptable match tolerance can be greater or lesser than 90%. Determining the presence of the mineral or gemstone in the soil may occur in real time or near real time with detecting the outgas signature.

The presence of the mineral or gemstone is conveyed at step 370. For example, the chemical detector device can include a screen, light, or other indicator which may activate to signal the presence of the known element(s). In some embodiments, the chemical detector device includes a screen on which the one or more detected mineral or gemstone is displayed, for example, by name. Additionally or alternatively, an alert (e.g., a sound, light, haptic effect, etc.) signals the presence of one or more detected known mineral or gemstone. Information can be transferred from the chemical detector device to a different platform, such as a phone, tablet, computer, etc., which can then be accessed to obtain details of the detected known mineral or gemstone. Such a configuration can be used in the alternative or in addition to information displayed on a screen of the chemical detector device itself.

As noted above, modifications can be made to the order of the steps. For example, in some instances, positioning a chemical detector device relative to the surface of the soil and/or detecting the presence of one or more emitted gas may occur simultaneously to one another and/or to disturbing at least a portion of the surface soil.

Figure 4:
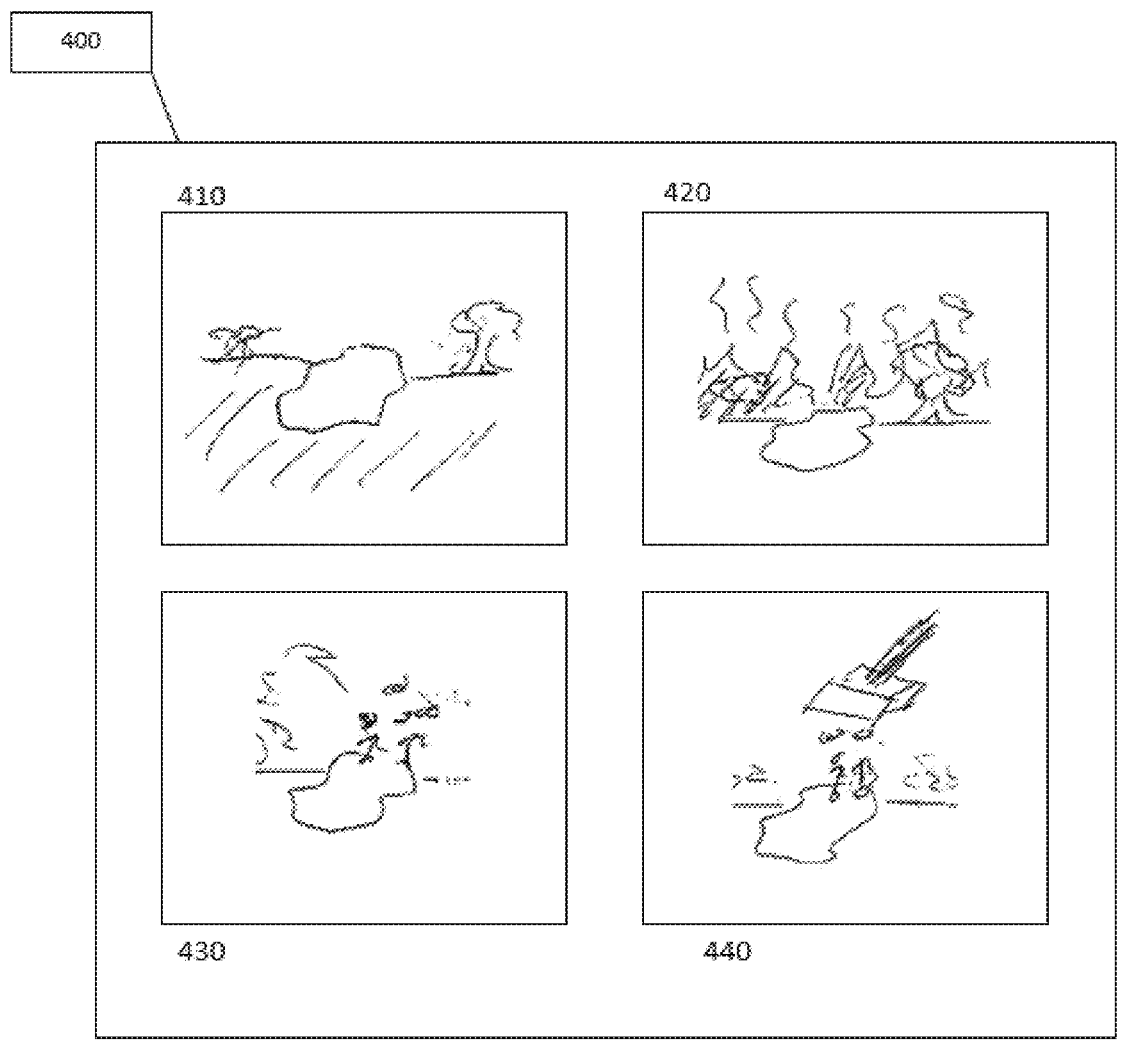
FIG. 4 illustrates an embodiment of the process of FIG. 3B for detecting the mineral or gemstone deposit in accordance with illustrative embodiments.

FIG. 4 pictorially illustrates one implementation, identified as "method 400", of the method of FIG. 3B. More particularly, the method 400 burns at least a portion of soil at the surface of a search region and, consequently, detects an outgas signature from the burned soil. FIG. 4 shows a cross-section of the plot of land as having at least one search region at 410. The plot of land contains an unknown deposit of a known element, which, absent burning, may go unnoticed because, for example, the deposit is covered with soil.

At 420, at least a portion of the soil at the surface of the search region is burned by a fire. In some instances, the fire may be a natural occurrence. Fire induced temperature increases in soil may persist for an extended period of time after the fire, depending on the severity of the fire and the recovery conditions of the soil. Accordingly, identifying the plot of land for surveying (410) can occur following a natural fire. In some such cases, further disturbing the soil by burning may not be needed as the prior fire may be sufficient to have caused a reaction in the soil and elicit outgassing from element(s) that may be present in the soil. In other instances, the fire may be purposefully set, for example, for the purpose of causing a chemical reaction in at least a portion of the soil.

Surface soil burned from a fire can have high temperatures (e.g., up to 150 degrees). Significant heating of soil from a surface fire may extend to a depth into the soil from the surface (e.g., about 10-16 inches deep). Burning at least a portion of the search region, regardless of whether the burning occurs naturally or intentionally, causes chemical reactions within the soil and the release of one or more gas from the soil as shown at 430. More particularly, burning the soil can cause certain known elements, if present in the search region, to emit a gas. By way of example, sulfur, jet, pyrite, arsenopyrite, anthraconite, amber, hutchinsonite, and coloradoite emit a characteristic gas when heated.

The outgassing from the soil is detected as an outgas signature by the chemical detector device at 440. As illustrated, the chemical detector device is placed on or above the surface of the soil to detect the outgas signature from the soil. As discussed with reference to FIG. 3B, the detected outgassing or chemical signature is then analyzed and compared to characteristic outgas signatures of known elements. In this manner, unknown deposits of known elements can be located in soil after at least a portion of the soil is burned.

Additionally or alternatively, the detected outgas signature may be compared to an expected outgas signature for the search region after burning. An expected outgas signature is determined based on one or more known elements or plants present in the search region. For example, if plants are present in the search region, certain elements (e.g., nitrogen, phosphorous, sulfur, etc.) that are necessary for the survival of plants are expected to be found in an outgas signature when the plants are burned. The expected outgas signature may be derived based on, for example, the type of plants present in the region, the amount of a certain plant type present in the region, and/or an estimated plant burn. The detected outgas signature can be compared to the expected outgas signature to determine the presence of undiscovered elements, which cause the detected outgas signature to deviate from the expected outgas signature.

Figure 5:
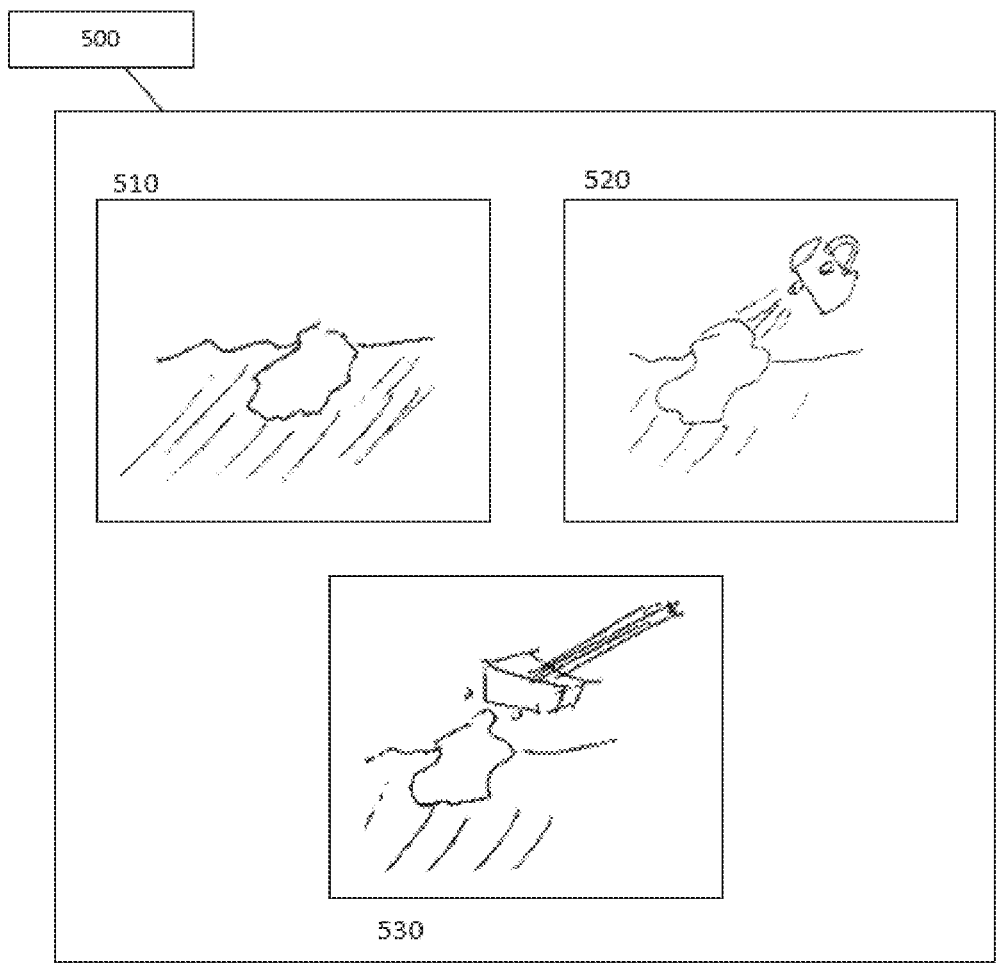
FIG. 5 illustrates another embodiment of the process of FIG. 3B for detecting the mineral or gemstone deposit in accordance with illustrative embodiments.

FIG. 5 pictorially illustrates another implementation, identified as "method 500," of the method of FIG. 3B. More particularly, the method 500 detects an outgas signature from soil of a search region where at least a portion of a surface of the soil of the search region has undergone a chemical reaction from the application of a chemical. This method 500 can be useful in instances in which a target element does not naturally emit a characteristic gas (either with or without burning), or in instances in which an element that does not naturally emit a characteristic gas may be present in the soil. The plot of land of this example includes at least one search region at 510 with an unknown deposit of a known element. As with other implementations, absent illustrative embodiments, the unknown deposit may go unnoticed, for example, because the deposit is covered with soil. At 520, a chemical is applied to the surface of the soil, for example, by spraying a chemical on at least a portion of a surface of the soil of the search region. By way of example, the chemical may be a caustic spray, sulphuric acid, hydrochloric acid, etc. The sprayed chemical causes a chemical reaction with the soil and results in outgassing from the one or more element located within the soil.

The outgas signature is detected using the chemical detector device 608 at 530. As described above, the detected outgas signature is then analyzed and compared to known outgas signatures to determine a presence of one or more elements in the soil. More particularly, the detected outgas signature may be compared to a characteristic outgas signature of one or more known element when that known element undergoes a chemical reaction induced by the chemical that was applied to the soil in step 520. By way of example, some elements that react to certain chemicals and emit a gas include carbonates (e.g., azurite, calcite, dolomite, magnesite, rhodochrosite, siderite, smithsonite, stronianite, witherite), sulfides, and pyrite. By comparing the detected outgas signature to outgas signatures of known elements to the chemical(s) applied in step 520, the presence of one or more known element in the soil is detected.

The embodiments of the invention described above are intended to be merely exemplary; numerous variations and modifications will be apparent to those skilled in the art. Such variations and modifications are intended to be within the scope of the present invention as defined by any of the appended claims.

What is claimed is:

1. A method of searching for and locating a mineral or gemstone deposit in soil, in a search region on a plot of land, the method comprising:
   positioning a chemical detector capable of chemically detecting elements present in a gas on or above a surface of soil located within said search region on said plot of land;
   disturbing at least a portion of the soil while said detector is in said search region to cause a chemical reaction such that the soil emits an outgas signature while said detector is in said search region on said plot of land;
   scanning said chemical detector over at least a portion of said search region on said plot of land to thereby chemically detect, at or above the surface of the soil in said search region on said plot of land, the outgas signature emitted from the soil as a result of said chemical reaction using the chemical detector at said search region; and
   determining a presence of one or more mineral or gemstone in the soil at said search region on said plot of land based on the detected outgas signature to thereby locate mineral or gemstone deposits in said search region.

2. The method of claim 1, wherein disturbing the at least a portion of the soil includes at least one of burning the at least a portion of the soil, applying an acid or a chemical to the at least a portion of the soil, applying a gas to the at least a portion of the soil, or directing a light beam to the at least a portion of the soil.

3. The method of claim 1, wherein positioning the chemical detector includes positioning the chemical detector on the surface of the soil.

4. The method of claim 1, wherein positioning the chemical detector includes positioning the chemical detector above the surface of the soil.

5. The method of claim 1, wherein detecting the outgas signature emitted from the surface of the soil further comprises scanning the chemical detector over at least a portion of the surface of the soil.

6. The method of claim 1, wherein the mineral or gemstone is selected from the group consisting of sulfur, pyrite, arsenic, arsenopyrite, antozonite, sphalerite, jet, anthraconite, amber, oil shale, kaolinite, gypsum, carbonate, galena, hutchinsonite, and coloradoite.

7. The method of claim 1, wherein determining the presence of the one or more mineral or gemstone in the soil based on the detected outgas signature further comprises determining that the detected outgas signature includes a level of at least one characteristic gas after the soil was burned by fire that deviates from an expected level of the at least one characteristic gas.

8. The method of claim 1, wherein determining the presence of the one or more mineral or gemstone in the soil based on the detected outgas signature occurs in real-time or near real-time to detecting the outgas signature emitted from the soil.

9. A computer program product for use on a computer system for searching for and locating a mineral or gemstone deposit in soil, in a search region on a plot of land, the computer program product comprising a tangible, non-transient computer usable medium having computer readable program code thereon, wherein:
   said program code is adapted to (i) receive from a chemical detector, capable of chemically detecting elements present in a gas, a detected outgas signature emitted from a surface of soil in said search region on said plot of land as a result of a chemical reaction in the soil located within a search region while said detector scans over at least a portion of said search region on said plot of land,
   (ii) compare the detected outgas signature to one or more characteristic outgas signatures of known minerals or gemstones,
   (iii) determine a match between the detected outgas signature and the one or more characteristic outgas signatures and
   (iv) determine a presence of one or more minerals or gemstones in the soil in said search region on said plot of land based on the determined match between the detected outgas signature and the one or more characteristic outgas signatures to thereby locate mineral or gemstone deposits in said soil,
   wherein the detected outgas signature is chemically detected while said detector scans over at least a portion of said search region on said plot of land at or above the surface of the soil in said search region.

10. The computer program product of claim 9, wherein the one or more minerals or gemstones is selected from the group consisting of sulfur, pyrite, arsenic, arsenopyrite, antozonite, sphalerite, jet, anthraconite, amber, oil shale, kaolinite, gypsum, carbonate, galena, hutchinsonite, and coloradoite.

11. The computer program product of claim 9, wherein determining the presence of the one or more minerals or gemstones occurs in real-time or near real-time.

12. The computer program product of claim 9, wherein said program code is further adapted to compare the detected presence of the at least one characteristic gas to a library of known characteristic gas emissions associated with a mineral or gemstone.

13. A system for searching for and locating a mineral or gemstone deposit in soil in a search region on a plot of land, the system comprising:
   an electronic chemical detector capable of chemically detecting elements present in a gas configured to detect an outgas signature emitted from the soil as a result of a chemical reaction from a position at or above a surface of the soil within said search region on said plot of land while said detector scans over at least a portion of said search region on said plot of land; and
   a detection system tool configured to determine a presence of one or more minerals or gemstones in the soil in said search region on said plot of land based on the chemically detected outgas signature received from said detector as said detector is scanned over at least a portion of said search region, and characteristic outgas signatures of known minerals and gemstones including at least one characteristic gas.

14. The system of claim 13 further comprising an energy source configured to disturb at least a portion of the soil such that the soil emits the at least one characteristic gas.

15. The system of claim 14, wherein the energy source is a laser or a light beam.

16. The system of claim 14, wherein the energy source applies at least one of an acid, a chemical, or a gas to the at least a portion of the soil.

17. The system of claim 14, wherein the energy source burns the at least a portion of the soil.

18. The system of claim 13, wherein the mineral or gemstone is selected from the group consisting of sulfur, pyrite, arsenic, arsenopyrite, antozonite, sphalerite, jet, anthraconite, amber, oil shale, kaolinite, gypsum, carbonate, galena, hutchinsonite, and coloradoite.

19. The system of claim 13, wherein the detection system tool further comprises a comparator configured to compare the detected outgas signature to a library of known characteristic outgas signatures emitted from at least one of known minerals and known gemstones.

20. The method of claim 1, wherein said step of detecting is performed by a nose-on-a-chip, e-sniffer, or other chemical detector capable of detecting elements present in a gas.

21. The method of claim 1 wherein the step of determining the presence of one or more mineral or gemstone in the soil includes comparing the detected presence of the at least one characteristic gas to a library of known characteristic gas emissions associated with a mineral or gemstone.

22. A method of searching for and locating mineral or gemstone deposits in soil, within a search region on a plot of land, the method comprising:
    positioning a chemical detector capable of chemically detecting elements present in a gas on or above a surface of soil located within said search region on said plot of land;
    scanning said chemical detector over at least a portion of said search region on said plot of land;
    chemically detecting, at or above the surface of the soil, an outgas signature naturally emitted from the soil using the chemical detector while the chemical detector is scanned over at least a portion of said search region on said plot of land; and
    determining a presence of one or more mineral or gemstone in the soil at said search region on said plot of land based on the detected outgas signature to thereby aid in the search for and locate mineral or gemstone deposits in said search region on said plot of land.

23. The method of claim 22, wherein positioning the chemical detector includes positioning the chemical detector on the surface of the soil.

24. The method of claim 22, wherein positioning the chemical detector includes positioning the chemical detector above the surface of the soil.

25. The method of claim 22, wherein detecting the outgas signature emitted from the surface of the soil further comprises scanning the chemical detector over at least a portion of the surface of the soil.

26. The method of claim 22, wherein the mineral or gemstone is selected from the group consisting of sulfur, pyrite, arsenic, arsenopyrite, antozonite, sphalerite, jet, anthraconite, amber, of shale, kaolinite, gypsum, carbonate, galena, hutchinsonite, and coloradoite.

27. The method of claim 22, wherein determining the presence of the one or more mineral or gemstone in the soil based on the detected outgas signature occurs in real-time or near real-time to detecting the outgas signature emitted from the soil.

28. The method of claim 22 wherein the step of determining the presence of one or more mineral or gemstone in the soil includes comparing the detected presence of the at least one characteristic gas to a library of known characteristic gas emissions associated with a mineral or gemstone.

29. The method of claim 22, wherein said step of detecting is performed by a nose-on-a-chip, e-sniffer, or other chemical detector capable of detecting elements present in a gas.

30. The system of claim 13, wherein said chemical detector includes a nose-on-a-chip, e-sniffer, or other chemical detector capable of detecting elements present in a gas.

31. A method of searching for and locating a mineral or gemstone deposit in soil, the method comprising:
    positioning a chemical detector capable of chemically detecting elements present in a gas on or above a surface of soil located within a search region on a plot of land;
    disturbing at least a portion of the soil to cause a chemical reaction such that the soil emits an outgas signature;
    chemically detecting at or above the surface of the soil the outgas signature emitted from the soil as a result of said chemical reaction using the chemical detector; and
    determining a presence of one or more mineral or gemstone in the soil based on the detected outgas signature, to thereby locate mineral or gemstone deposits in said soil, by determining that the detected outgas signature includes a level of at least one characteristic gas after the soil was burned by fire that deviates from an expected level of the at least one characteristic gas.

* * * * *